: 2,911,407
Patented Nov. 3, 1959

2,911,407
SYNTHESIS OF 2,6-DIALKYLPIPERAZINES

William K. Langdon, Grosse Ile, and William W. Levis, Jr., Wyandotte, Mich., assignors to Wyandotte Chemicals Corporation, Wyandotte, Mich., a corporation of Michigan No Drawing. Application September 20, 1956
Serial No. 610,891

9 Claims. (Cl. 260—268)

This invention relates to the synthesis of 2,6-dialkylpiperazines. More specifically, this invention relates to a new method of synthesizing 2,6-dialkylpiperazines whereby unusually high conversions are obtained to the products of interest, ranging up to 70% and higher.

2,6-dialkylpiperazines are known compounds whose chemical and physical properties make them of interest as intermediates in the preparation of rubber accelerators, condensation polymers, pharmaceuticals, dyestuffs, and the like. In spite of their many interesting chemical and physical properties these compounds have heretofore been little more than laboratory curiosities because they have been obtainable only through difficult and costly syntheses.

An example of the methods known in the art for the preparation of piperazine compounds is given in U.S. Patent No. 2,525,223 entitled "Preparation of N-substituted Piperazines," Kenneth L. Howard, patentee. The Howard patent discloses a method for preparing nitrogen-substituted piperazines by reacting a dialkanolamine with an alkylamine in the presence of a catalyst, such as alumina-nickel or Raney nickel. In each of the five examples in the Howard patent a nitrogen-substituted piperazine was prepared by reacting diethanolamine with methylamine, ethylamine or isopropylamine in the presence of heat and a nickel-containing catalyst. The highest conversion obtained by Howard was in Example 4 where the conversion was 34%. In the remaining four examples the conversion was 16% or below. Such conversions are not adequate when the product of the process is to be prepared on a commercial scale. The Howard patent further discloses that other dialkanolamines can be reacted with a primary alkylamine in his process, such as 2-hydroxypropyl ethanolamine and di(2-hydroxypropyl) amine. However, only diethanolamine was employed in the examples provided by the Howard patent.

It is an object of this invention to provide an efficient and economical method for the synthesis of a 2,6-dialkylpiperazine.

It is a further object of this invention to provide a new method for synthesizing 2,6-dialkylpiperazines wherein the conversion to the product of interest is high enough to provide a commercially attractive process.

Other objects and advantages of this invention will become apparent from the following detailed description thereof.

We have found that 2,6-dimethylpiperazine or 2,6-diethylpiperazine can be prepared with conversions up to 70%, and higher, by heating ammonia with either diisopropanolamine or di-(2-hydroxybutyl)amine in the presence of a nickel or cobalt hydrogenation/dehydrogenation catalyst. The conversions we have obtained in our process are consistently from about 60 to over 70%. These surprisingly high conversions are over twice the conversions obtained by Howard, cited above, and our process is distinguishable from the Howard process in two important features. The most important distinction is that we employ ammonia as a reactant rather than a primary alkylamine. The second important distinction is that the dialkanolamine employed in our process is either diisopropanolamine or di-(2-hydroxybutyl)amine rather than the diethanolamine employed in the examples in the Howard patent. The complete technical explanation for the unusual increase in conversion when ammonia is used rather than a primary alkylamine and when diisopropanolamine or di-(2-hydroxybutyl)amine is employed rather than diethanolamine is not completely apparent. However, it should be apparent that such significant increases in conversion as are afforded by our process make our discovery most important since a commercially feasible process for preparing 2,6-dialkylpiperazines can be based on our process whereas such could not be based on the process of the Howard patent where the highest conversion to the product of interest obtained was 34%.

The 2,6-dialkylpiperazines which are prepared in accordance with this invention correspond to the formula

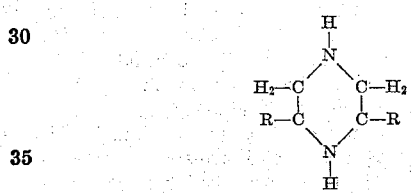

wherein R is a member selected from the group consisting of methyl and ethyl radicals. Thus, when R is a methyl radical, the product of our process is 2,6-dimethylpiperazine. When R is an ethyl radical, the product of our process is 2,6-diethylpiperazine.

The dialkanolamines which are used in our process correspond to the formula

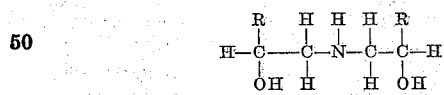

wherein R is a methyl or ethyl radical. Thus, when R is a methyl radical, the dialkanolamine employed is diisopropanolamine. When R is an ethyl radical, the dialkanolamine employed is di-(2-hydroxybutyl)amine. The significance of the fact that the dialkanolamine employed in our process is diisopropanolamine or di-(2-hydroxybutyl)amine when compared to the process of the Howard patent is shown by the fact that an attempt by us to react diethanolamine, the dialkanolamine used by Howard, with ammonia was largely unsuccessful since the conversion to piperazine was 14% in one run and 16% in another run. These runs were carried out at 190 and 200° C. under hydrogen pressure of 1200 and 1500 p.s.i.g. in the presence of Raney nickel catalyst for a reaction time of 8 and 10 hours, respectively.

The method of our invention is carried out by heating the ammonia and dialkanolamine reactant in the presence of a nickel or cobalt catalyst. The temperature at which the reaction is conducted can be varied over quite a wide range. The minimum lower temperature that can be employed is dependent upon catalyst activity, catalyst concentration and reaction time. In general, the temperature should be between about 125 and 250° C. We have found that our best conversions were obtained when the temperature was between about 170 to 200° C.

The method of the invention is carried out under at least sufficient pressure to maintain the dialkanolamine reactant in liquid phase. Although the reaction proceeds and conversions of 50% or more are obtained when only the reactants previously mentioned, that is, ammonia and the dialkanolamine, are employed with the catalyst, the purity of the 2,6-dialkylpiperazine product is improved and some improvement in conversion is obtained when the pressure required to maintain the dialkanolamine reactant in liquid phase is provided by hydrogen gas. Therefore, it is highly preferred to maintain at least sufficient pressure of hydrogen gas on the reactants to maintain the dialkanolamine reactant in liquid phase. Our work has been carried out over a broad range of pressures and the pressure employed can range from the minimum amount necessary to maintain the dialkanolamine reactant in liquid phase up to 1000 to 2000 p.s.i.g. Our best results in terms of the high conversions obtained was at hydrogen pressures from about 350 to 950 p.s.i.g.

The catalyst which is employed in the method of our invention is a nickel or cobalt hydrogenation/dehydrogenation catalyst. Alloy skeletal nickel and alloy skeletal cobalt catalysts have been found to be particularly effective when the method of the invention is carried out as a batch process. However, the method of the invention can be carried out continuously in liquid or mixed phase systems, and in this case a supported nickel or cobalt hydrogenation/dehydrogenation catalyst is used. Such supported nickel and cobalt hydrogenation/dehydrogenation catalysts are available commercially. The supported nickel and cobalt catalysts commonly employ kieselguhr or other support materials, such as silica gel, pumice, and the like, as the support. Illustrative of the supported nickel and cobalt catalysts which can be used in the method of the invention when it is carried out continuously in liquid phase are the supported nickel and cobalt catalysts sold commercially by Harshaw Chemical Company under the code names "Ni 0104T," "Ni 0107T" and "Co 0102T."

Supported nickel and cobalt catalysts are commonly prepared by suspending a finely divided inert catalyst support in an aqueous solution of a salt of the nickel or cobalt. An insoluble nickel or cobalt carbonate is precipitated, filtered, washed and dried, mixed with a lubricant and support and pressed into a pellet or other desired physical form, followed by reduction by heating in the presence of hydrogen gas.

Alloy skeletal nickel or cobalt catalysts can be prepared by dissolving aluminum from finely divided nickel-aluminum or cobalt-aluminum alloys.

When the method of this invention is carried out as a batch process, a catalyst concentration of about 2 grams of catalyst per mol of dialkanolamine is effective in the process. The upper limit on the amount of the catalyst used in a batch process is dictated by purely economic considerations. We have obtained our best conversions in batch systems when about 10 grams of catalyst were employed per mol of dialkanolamine reactant. The amount of the catalyst employed will vary over a range depending on the particular catalyst chosen and its activity as well as on the other conditions observed in carrying out the reaction.

As has been mentioned earlier, the method of the invention is adaptable to either batch or continuous systems. When the method is carried out as a batch process, the reaction time should be about 2 hours or more. The upper limit on reaction time is, again, dictated by economic considerations and a reaction time as high as 10 hours can be used. Our best results were obtained when reaction times in the range from about 4 to 6 hours were employed.

Diluents or solvents can be employed in the reaction of the invention. We have found that water can be used as a diluent in the process; in fact, we have used water as a diluent by employing aqueous ammonia as a reactant in the process. Excess ammonia is used in the process and itself acts as a reaction diluent.

As was stated above, it is desirable that an excess of ammonia be employed in the reaction. By an excess, we mean that greater than a 1:1 mol ratio of ammonia to dialkanolamine reactant is employed. Our best conversions were obtained when a mol ratio of ammonia to dialkanolamine reactant of 2:1 was employed. However, a mol ratio of 1:1 and above is satisfactory and the high conversions which are characteristic of our process are obtained. Since the most important feature of our invention is the high conversions which we have obtained, in contrast to the low conversions of the prior art as exemplified by the Howard patent, it is not desirable to employ a mol ratio of ammonia to dialkanolamine of less than 1:1 since the result is to decrease the conversion obtained in the reaction.

The following examples are provided so as to more clearly illustrate the method of this invention to those skilled in the art and they should not be employed to unduly restrict the invention as disclosed and claimed herein.

EXAMPLE I

A series of runs was carried out wherein diisopropanolamine was reacted with ammonia in a batch system. Amounts of reactants used, the conditions under which these runs were carried out and the results obtained are summarized below in Table 1. These runs were carried out employing Raney nickel as the catalyst with the exception of run No. 4 wherein Raney cobalt was employed. The procedure followed was that a weighed amount of the catalyst, drained of excess water, was washed from a beaker into a one-gallon, stainless steel, stirred autoclave with the reactants. The ammonia in runs 1 and 2 was charged as a 28% aqueous solution of ammonia. The ammonia in runs 3 and 4 was anhydrous ammonia gas. The autoclave was purged by pressurizing and venting twice with nitrogen and once with hydrogen gas to about 10 p.s.i.g. After venting the autoclave for the third time, the pressure was adjusted to about 50 p.s.i.g. with hydrogen and the reactants heated with stirring to the indicated temperature. The pressure was adjusted by venting or by the addition or more hydrogen gas.

In runs 3 and 4 employing anhydrous ammonia, the ammonia was withdrawn from the main storage cylinder into a tared cylinder of about one liter capacity. The tared cylinder was then weighed to determine the amount of ammonia which was then forced into the charged and purged autoclave by nitrogen pressure. The final weight of the tared cylinder showed the exact amount of ammonia charged. At the end of the reaction period, the product mixture was cooled, drawn off, filtered through a bed of Celite, and analyzed by fractional distillation.

The results of these runs are summarized below in Table 1:

Table 1.—Preparation of 2,6-dimethylpiperazine
RANEY NICKEL CATALYST

| Run No. | Charge | | Catalyst, g. | Temp., °C | Pressure, p.s.i.g. | | Time, hrs. | 2,6-Dimethylpiperazine | |
|---|---|---|---|---|---|---|---|---|---|
| | Diisopropanolamine, Mols | NH₃, Mols | | | Initial | Max. | | Conversion, Percent | Yield, Percent |
| 1 | 5.0 | a 10.0 | 100 | 173-176 | 50 | 370 | 4.0 | 68 | (e) |
| 2 | 9.8 | a 9.8 | 98 | 195 | 50 | 477 | 4.9 | 57 | (e) |
| 3 | 10.0 | b 19.8 | 100 | 190 | 140 | 970 | 6.0 | 60 | 70 |
| 4 | 5.0 | b 10 | d 50 | 190 | 200 | 930 | 6.0 | 73 | (e) | a As 28% aqueous ammonia.
b As anhydrous ammonia.
e Not determined.
d Raney cobalt catalyst.

The terms "conversion" and "yield" employed in this application are calculated as follows:

$$\text{Percent conversion} = \frac{(\text{mols product obtained}) \times (100)}{(\text{mols dialkanolamine charged})}$$

Percent yield $$= \frac{(\text{mols product obtained}) \times (100)}{[(\text{mols dialkanolamine charged}) - (\text{mols dialkanolomine recovered})]}$$

The remarkably high conversions obtained in these runs is quite unexpected in view of the relatively low conversions obtained in the Howard patent when diethanolamine was reacted with a primary alkylamine, such as methylamine, ethylamine, and the like. As was stated before, we have found that such high conversions as are obtained in our process are not obtained when diethanolamine is reacted with ammonia. Thus, the fact that we employ ammonia rather than a primary alkylamine and the fact that we employ diisopropanolamine or di-(2-hydroxybutyl)amine as the dialkanolamine reactant are believed to be significant and distinguishing characteristics of our method.

EXAMPLE II

A further run was carried out following the procedure described in Example I wherein the dialkanolamine reactant employed was di-(2-hydroxybutyl)amine. The di-(2-hydroxybutyl)amine was reacted with ammonia as a 28% aqueous solution in the presence of Raney nickel catalyst. Six mols of di-(2-hydroxybutyl)amine and 12 mols of ammonia as 28% aqueous solution were employed in the presence of 60 grams, on a wet basis, of Raney nickel catalyst. The reactants were heated in the autoclave at 190° C. for 4 hours during which time the maximum pressure observed was 455 p.s.i.g.

The result of this run was a 36% conversion and 61% yield to 2,6-diethylpiperazine.

The result of our successfully reacting a dialkanolamine with amonia to provide 2,6-dialkylpiperazines as the product is that it is now possible to base a commercial process on this reaction. This could not be possible, heretofore, because of the low conversions obtained when the reactant employed was a primary alkylamine as disclosed in the Howard patent. Thus, our invention resides in a method for preparing a 2,6-dialkylpiperazine, that is, 2,6-dimethylpiperazine or 2,6-diethylpiperazine, by heating ammonia and either diisopropanolamine or di-(2-hydroxybutyl)amine under pressure at least sufficient to maintain the dialkanolamine reactant in liquid phase in the presence of a nickel or cobalt hydrogenation/dehydrogenation catalyst.

This application is a continuation-in-part of application Serial Number 484,436, filed January 27, 1955, now abandoned.

We claim:

1. A method for preparing a 2,6-dialkylpiperazine corresponding to the formula

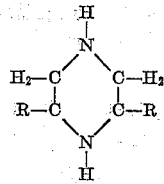

wherein R is a member selected from the group consisting of methyl and ethyl radicals, which comprises, heating to from 125–250° C. ammonia and a di-(2-hydroxyalkyl)-amine corresponding to the formula

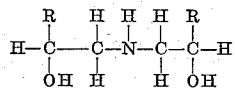

wherein R is defined as stated above and wherein at least 1 mol of ammonia is employed per mol of said di-(2-hydroxyalkyl)-amine, under pressure at least sufficient to maintain the di-(2-hydroxalkyl)amine reactant in liquid phase in the presence of a metallic hydrogenation/dehydrogenation catalyst selected from the group consisting of nickel and cobalt.

2. A method for preparing 2,6-dimethylpiperazine, which comprises, heating diisopropanolamine and ammonia to from 125–250° C. in a proportion of at least 1 mol of ammonia per mol of diisopropanolamine under pressure at least sufficient to maintain said diisopropanolamine in liquid phase in the presence of a nickel hydrogenation/dehydrogenation catalyst.

3. A method for preparing a 2,6-dialkylpiperazine corresponding to the formula

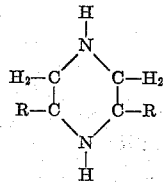

wherein R is a member selected from the group consisting of methyl and ethyl radicals, which comprises, heating to from 170–200° C. ammonia and a di-(2-hydroxyalkyl)amine corresponding to the formula

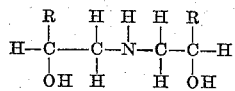

wherein R is defined as stated above and wherein at least 1 mol of ammonia is employed per mol of said di-(2-hydroxyalkyl)amine, under hydrogen pressure at least sufficient to maintain said di-(2-hydroxyalkyl)amine in liquid phase to a temperature of from 125 to 250° C. in the presence of a metallic hydrogenation/dehydrogenation catalyst selected from the group consisting of nickel and cobalt.

4. A method according to claim 3 wherein said di-(2-hydroxyalkyl)amine is diisopropanolamine and wherein said catalyst is a nickel hydrogenation/dehydrogenation catalyst.

5. A method according to claim 3 wherein said di-(2-hydroxyalkyl)amine is di-(2-hydroxybutyl)amine and wherein said catalyst is a nickel hydrogenation/dehydrogenation catalyst.

6. A method according to claim 3 wherein said di-(2-hydroxyalkyl)amine is diisopropanolamine and wherein said catalyst is a cobalt hydrogenation/dehydrogenation catalyst.

7. A method according to claim 3 wherein said di-(2-hydroxyalkyl)amine is di-(2-hydroxybutyl)amine and wherein said catalyst is a cobalt hydrogenation/dehydrogenation catalyst.

8. A batch process for preparing a 2,6-dialkyl piperazine corresponding to the formula,

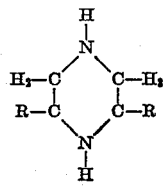

wherein R is a member selected from the group consisting of methyl and ethyl radicals, which comprises, heating to about 170–200° C. ammonia and a di-(2-hydroxyalkyl)-amine corresponding to the formula,

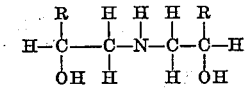

wherein R is defined as stated above and wherein about 2 mols of ammonia per mol of said di-(2-hydroxyalkyl)-amine are employed, said heating step being carried out for about 2–10 hours in a closed vessel under about 350–950 p.s.i.g. hydrogen pressure in the presence of a metallic hydrogenation/dehydrogenation catalyst selected from the group consisting of nickel and cobalt.

9. A method for preparing 2,6-dimethylpiperazine which comprises heating one mole of di-isopropanolamine and at least one mole of ammonia in the presence of a Raney nickel catalyst to a temperature within the range of 125° C. to 250° C. under superatmospheric pressure at least sufficient to maintain said di-isopropanolamine in the liquid phase.

References Cited in the file of this patent
UNITED STATES PATENTS
2,525,223   Howard _____ Oct. 10, 1950

UNITED STATES PATENT OFFICE
CERTIFICATE OF CORRECTION

Patent No. 2,911,407

November 3, 1959

William K. Langdon et al.

It is hereby certified that error appears in the printed specification of the above numbered patent requiring correction and that the said Letters Patent should read as corrected below.

Column 4, line 62, for "or", second occurrence, read -- of --; Column 7, line 26, in the formula for a 2,6-dialkyl piperazine, strike out "—$H_3$" attached to the upper C atom on the right-hand side of the formula and insert therefor -- —$H_2$ --.

Signed and sealed this 19th day of July 1960.

(SEAL)
Attest:

KARL H. AXLINE
Attesting Officer

ROBERT C. WATSON
Commissioner of Patents